United States Patent [19]

Hrifko

[11] Patent Number: 5,454,193
[45] Date of Patent: Oct. 3, 1995

[54] WINDOW GLASS FOR AUTOMOBILES, RECREATION VEHICLES OR BUILDINGS

[76] Inventor: Harold H. Hrifko, 9024 Hogans Bend, Tampa, Fla. 33647-2426

[21] Appl. No.: 268,825

[22] Filed: Sep. 2, 1994

Related U.S. Application Data

[63] Continuation-in-part of Ser. No. 3,586, Apr. 15, 1993, abandoned.

[51] Int. Cl.$^6$ ........................................ E06B 7/16
[52] U.S. Cl. ............... 49/501; 296/146.16; 296/146.15; 428/192; 428/83; 49/502
[58] Field of Search ................ 428/81, 83, 192; 296/146.15, 146.16, 146.2, 200, 93; 362/31; 49/501, 502, 440, 441, 348–352; 52/204.51, 207, 204.591, 717.01, 745.15, 745.16

[56] References Cited

U.S. PATENT DOCUMENTS

| | | | |
|---|---|---|---|
| 1,785,696 | 12/1930 | Hackett et al. | 428/81 |
| 2,162,987 | 6/1939 | Winship | 52/308 |
| 2,772,915 | 12/1956 | Renno | 296/146.16 X |
| 3,907,358 | 9/1975 | Barenyi et al. | 49/502 X |
| 4,277,528 | 7/1981 | Doi et al. | 42/81 X |
| 4,507,416 | 2/1985 | Parasin | 52/595 |
| 4,532,741 | 8/1985 | Knüdel | 296/93 X |
| 4,800,681 | 1/1989 | Skillen et al. | 49/440 |
| 4,843,763 | 7/1989 | Mesnel | 49/440 |
| 4,901,476 | 2/1990 | Nagashima et al. | 49/501 X |
| 5,096,757 | 3/1992 | Chen | 428/36.8 |

Primary Examiner—Carl D. Friedman
Assistant Examiner—Robert J. Canfield
Attorney, Agent, or Firm—Dominik & Stein

[57] ABSTRACT

A design for a piece of glass by means of which the piece of glass, such as window glass, can be sturdily contact mated to an internal face of a frame or bay. As a result of the window edge shape, contact between the glass and housing is improved, undesirable ventilation is inhibited, lateral displacement is restrained, and rattling is prevented.

The invention further concerns a system for mounting window glass in an automobile, a recreational vehicle or a building.

2 Claims, 2 Drawing Sheets

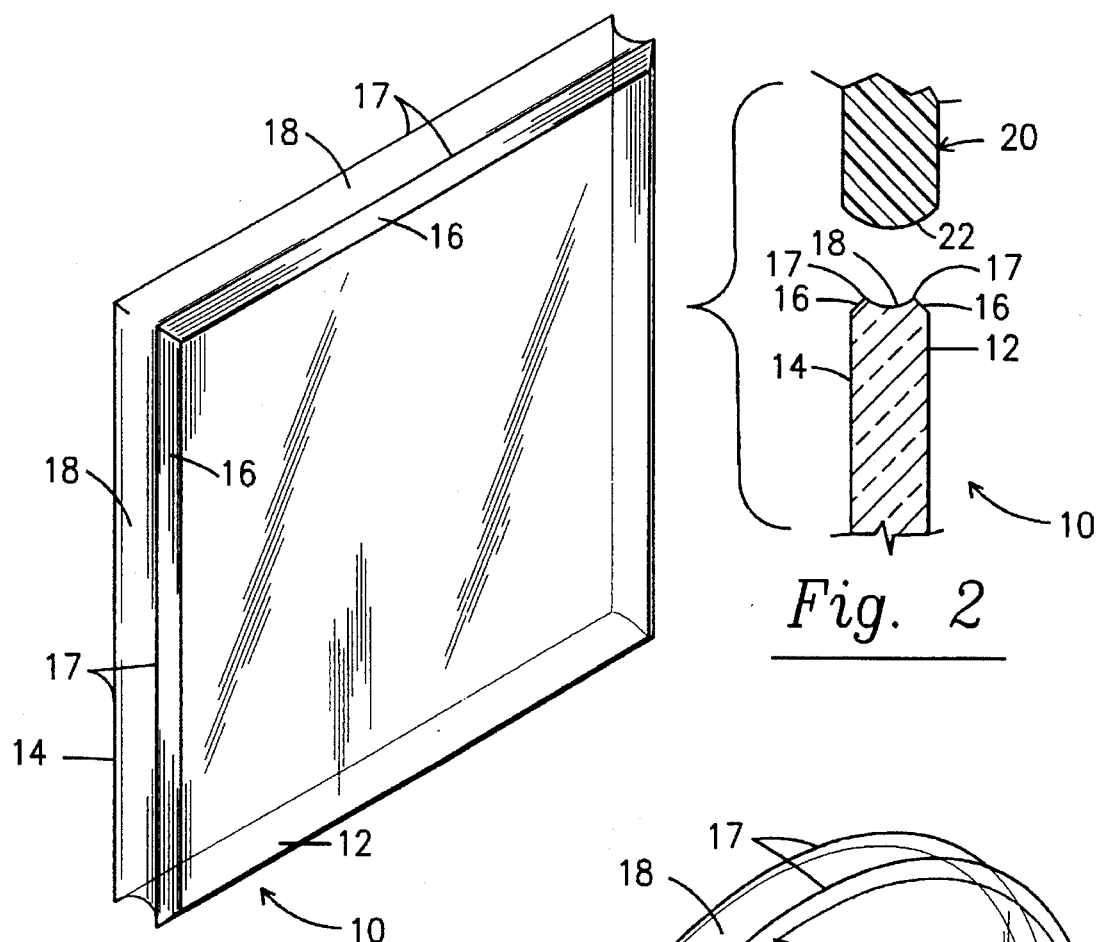
Fig. 2
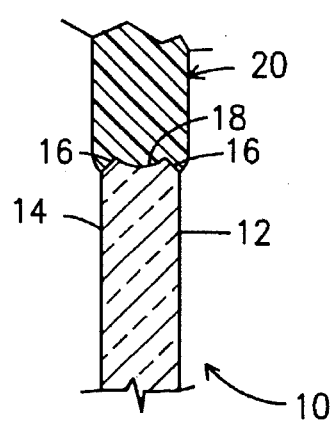
Fig. 1
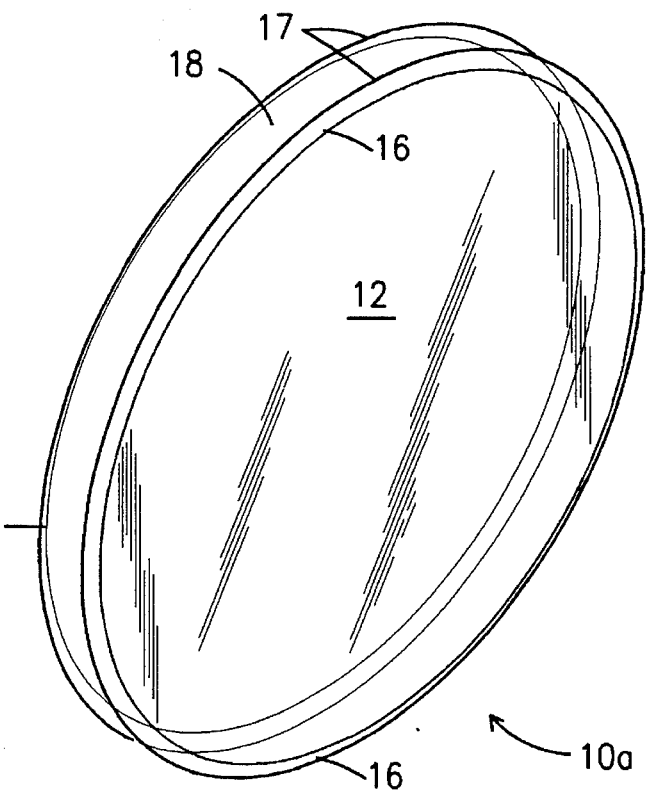
Fig. 3
Fig. 4

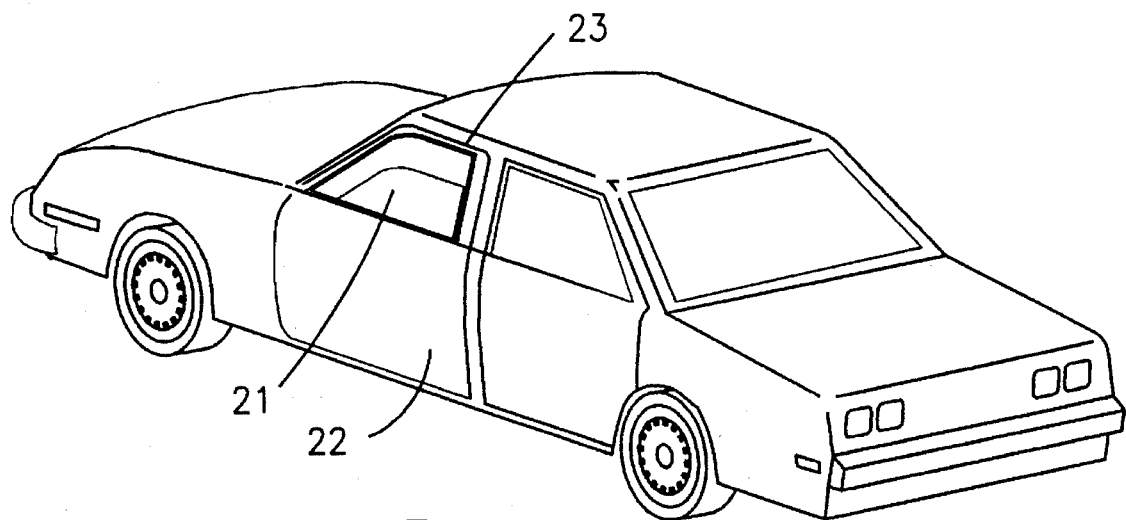
Fig. 5
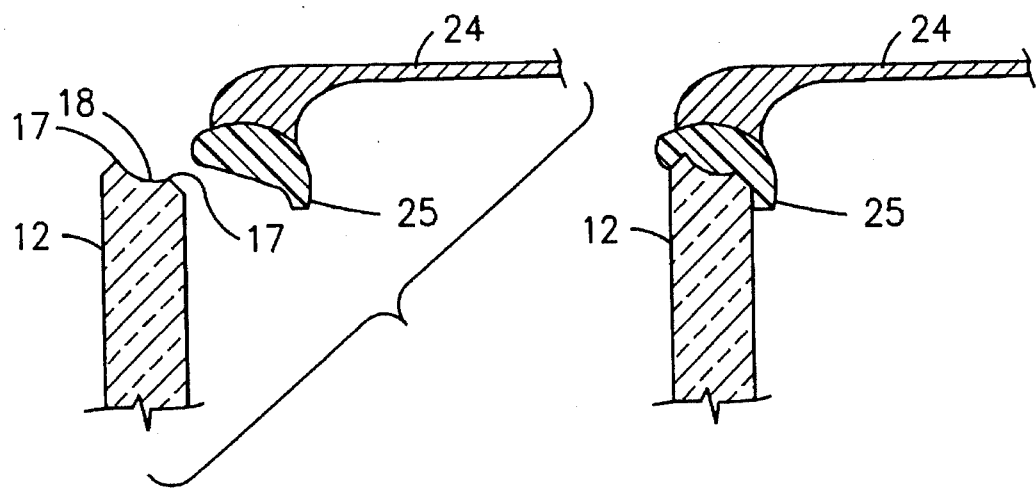
Fig. 6
Fig. 7

WINDOW GLASS FOR AUTOMOBILES, RECREATION VEHICLES OR BUILDINGS

This is a continuation-in-part of application Ser. No. 08/003,586 filed Apr. 15, 1993, now abandoned.

BACKGROUND OF THE INVENTION

1. Field of the Invention

The present invention relates generally to a design for a piece of glass by means of which the piece of glass car be situated more sturdily in a housing such as the frame of a building window or the molding of an automobile window frame. The invention relates more particularly to a design by which an external periphery forming an edge of the piece of glass can be sturdily contact mated to an inward facing surface of a frame or bay.

As a result of the window edge shape according to the present invention, contact between the glass and housing is improved, undesirable ventilation is inhibited, noise penetration is lowered, lateral displacement is arrested, and any possibility of rattling is eliminated.

The invention further concerns a system for mounting window glass in an automobile, a recreational vehicle (e.g., a boat, airplane, camper, etc.) or a building.

2. Description of the Related Art

Glass as used in windows of buildings or cars generally has a thickness of from ⅛ to ¾ inches, is solid (i.e., not hollow), and is generally substantially planar (i.e., it comprises front and back relatively large flat surfaces surrounded by a relatively thin peripheral edge), although some windows such as sky-light windows may include an outward bulge.

Currently, glass panels or panes for use in windows are prepared by cutting a large piece of glass to size. As a result, the peripheral edges, when seen in cross section, have a squared-off appearance. Where there is a possibility of human contact with the glass, for safety reasons the glass edges may be rounded or beveled prior to installation.

One problem with such a glass having an edge which is rounded and smooth, is that the rounded surface tends to lower contact area with the mating surface, increasing the ability pressure on the glass to cause the window glass to be displaced laterally against a contact surface or to rattle, particularly when the contact pressure between the glass and molding is not strong.

This is a problem in automobiles having electrically or manually operated windows so that the car window may be in a first or open position, but may be rolled up or slid to a second or closed position. When the window is in the closed position, the contact area between the glass and the molding is not large, the contact pressure between the glass and molding may not be strong, and the window may not provide air- and water-tight integrity, since (a) after many years the molding tends to wear, so that the contact becomes loose, (b) the electrical or manual means for urging the window upwards against a downward facing mating surface tends to wear, so that the force urging the window against the mating surface is not as strong, and (c) the turbulence and changes in air pressure on front fixed windshields and side openable windows creates pressure and suction forces on windows, so that windows which do not have a tight fit with their frame tend to vibrate and wear out molding at an accelerating rate.

In boats, the secure mounting a port-hole window is critical, since waves hitting the window can exert a tremendous amount of force, and since a window which is not water-tight can have serious consequences.

In buildings, the problem of contact mating is particularly noticeable on windows having a relatively large surface area and a small contact area, such as "picture windows", glass doors, etc., since pressure on the glass such as sonic noise from airplanes, passing automobiles, or construction, or lower frequency vibrations within a building, can create large lateral forces against the window, which can cause the glass to rattle. Furthermore, changes in ambient pressure has been known to cause windows to be "blown out" of large office buildings. A window pane design is needed which can better insure that windows will not be laterally displaced.

Further, contact surfaces and mating geometry between the glass periphery and the molding or weather stripping of a window frame or bay is limited. This problem becomes more noticeable where the glass is intended to be slidable or movable between a first position and a second position.

One approach to permanently mounting a window pane having beveled edges in a vehicle is shown in U.S. Pat. No. 4,532,741 (Knudel). This system is quite complex, and is not adaptable to a window pane which is intended to be openable and closeable.

U.S. Pat. No. 2,772,915 (Renno), in FIGS. 5 and 7, shows a window assembly including a weatherstrip against which a window can be closed and opened. However this weatherstrip does not hold a window sufficiently securely to insure watertight integrity and to prevent lateral motion and rattling.

U.S. Pat. No. 5,096,757 (Chen) provides a packing rubber of a design for sealing the gap between the window glass and window frame upper trim of a vehicle. The packing rubber has a diamond-shaped channel bar having an unitary retainer rib longitudinally displaced at the top for insertion into the window glass channel of the door frame of a vehicle, and a window glass channel longitudinally disposed along the bottom for holding window glass of a vehicle. The packing rubber fits securely into the recess in the vehicle frame provided for holding the window. However, this design is intended to mask the problem of loose, leaky or vibrating windows rather than prevent the problem.

While the above mentioned patents are representative of the designs which have been developed to mate window glass to window panes, frames or bays, they each clearly build in other problems, limitations and disadvantages. For example, they involve complex additional pieces of hardware, which increase manufacturing and assembly costs, and involve additional parts which can wear or fail. Further, designs which involve protruding weather strips increases wind noise in automobiles.

In view of the foregoing, it is an object of the present invention to provide a window glass of a design which eliminates or minimizes the above-mentioned and other problems, limitations and disadvantages typically associated with conventional windows and glass mounting systems, and to provide an system which is light weight, simple to manufacture, conforms with existing window glass designs, is easy to install and use, inexpensive, reliable, compact and which does not detract from the aesthetic appearance of the window.

SUMMARY OF THE INVENTION

After extensive investigation and experimentation, the present inventor has discovered that the objects of the invention can be simply, eloquently, and inexpensively accomplished by a glass which is generally planar in shape (although it may include an outward bulge as is conventional in sky-lights, etc.), and comprising first and second surfaces surrounded by an external periphery forming an edge, at least one segment of said edge being beveled between the first surface and the edge and between the second surface and the edge, said edge further comprising a concave channel running between said bevels.

As a direct consequence of the shape of the edge (comprising bevels and concave channel), the piece of glass can be is sturdily contact mated to an internal face of a frame or bay. A smaller than conventional amount of contact pressure is required to secure the edge of the piece of glass against lateral displacement. As a result, the window is less likely to rattle (for example, during the driving of an automobile or as a result of the effect of airplane or construction equipment noise on the windows of a building).

As a further advantage of the present invention, the glass having the beveled and concave edge of the present invention, when mated against a piece of molding or weather stripping, forms a compounded barrier which increases the barrier effect in the contact area between the glass and the internal mating face of the window frame or bay, thus rendering the seal air- and water-tight and leak-proof.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other window glass edge designs for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which:

FIG. 1 is an oblique view of a first embodiment of a piece of glass having a concave and beveled edge.

FIG. 2 shows the piece of glass of FIG. 1 in cross section prior to contact with a strip of pliable molding.

FIG. 3 shows the piece of glass in pressure contact with the strip of pliable molding.

FIG. 4 is an oblique view of a second embodiment of a piece of glass having a concave and beveled edge.

FIG. 5 shows an automobile with a driver side window in a partially opened position.

FIG. 6 is a transverse cross section of an automobile window of the "frameless" type as would appear with a partially opened door.

FIG. 7 shows the same window as in FIG. 6, with the window and door in a closed position.

DETAILED DESCRIPTION OF THE INVENTION

The present invention more specifically concerns a piece of glass such as a glass window pane having at least a first surface and a second surface surrounded by an edge, said edge having at least one segment having beveled peripheral edges, wherein a concave groove runs longitudinally along said edge and between the bevels.

The piece of glass is preferably a generally planar piece of solid glass such as used in windows in an automobile or a recreational vehicle.

The term "glass" as used herein may refer to any panel of material which is transparent or semitransparent. The term "glass" is used herein in the generic sense, and includes safety composite glass, semi-tempered glass, and transparent plastic. It will be understood that the term "glass" is used herein for convenience only and that other types of glass, or glass substitutes including various hard transparent resins such as acrylic or butyral resins or acrylate plastics (e.g., methyl acrylate or plexiglass) may be used in the invention in lieu of glass.

The concave or "u" shaped channel between the bevels is not particularly limited in design or depth, but it will be readily apparent that if the channel is very deep, the ridges formed between the channel and bevels on the contact surface of the piece of glass may be too sharp for human contact or for repeated contact between the glass and, e.g., a section of blown rubber molding provided on the interior of an automobile window frame of a slidable automobile window. On the other hand, if the channel is too shallow, the compound barrier effect will be lessened. Accordingly, any design engineer will readily be able to select the proper channel depth and bevel angle for a particular application.

For example, automobile windows which are of the type which can be opened and closed fall into two main categories, those in which a frame is provided on the door (see FIG. 5 and associated text), so that the frame and window always have a fixed relationship to each other, and those where the window is "frameless" when the door is opened, i.e., the frame is integral with the automobile rather than with the door, so that upon opening the door the window and frame separate laterally (see FIGS. 6 and 7 and associated text). In the first type, since the force of the window on the frame is always perpendicular to the molding in the frame, the beveling of the window is preferably symmetrical. In the case of the frameless window, there are two forces: (1) the force of extending the window upwardly against the molding while the door is closed, and (2) the force of closing the car door, with extended window, sideways against the molding. In the case of the frameless window, it is preferred that the beveling be asymmetrical.

The invention will now be discussed in greater detail.

The window pane was first designed for use in an automobile or recreational vehicle, and particularly an automobile or building window which can be rolled or slid to open and close. However, it will be readily apparent that the window pane design may be used with any artifact having the function of a window and wherein a piece of glass is intended to be securely or semi-securely held in place, such as a porthole in a boat, a glass cover for a picture, a lens in eye-glasses, a lens in a scuba diving mask, the walls of an aquarium or fish-tank, etc.

In a preferred embodiment of the invention, the glass is beveled between the first surface and the edge, and between the second surface and the edge, so that the edge is comprised of two bevels, and a concave channel running between said bevels. This design insures that the window, once in contact with an internal surface of a window frame, pane or bay, is secure against lateral displacement. A further advantage of such a design is that the piece of glass, by itself, can be used as the main element for displaying pictures. For example, a picture can be laminated or held against the piece of glass and a loop of wire can be placed in the channel to permit hanging of the piece of glass and displaying of the picture. The precise configuration of the piece of glass and mounting hardware is not critical, and may be individually tailored to the contours of the glass and intended application.

A great advantage of the system according to the invention is in the fact that the insulating and lateral displacement properties of the piece of glass are greatly enhanced, while there is no increase in manufacturing cost, no additional complex mounting hardware, and no detraction in appearance.

Referring now to FIG. 1, this figure illustrates a first embodiment of the concave channeled and double bevel edged piece of glass 10 according to the present invention. As better seen in the cross sectional view of FIG. 2, the edge between the first surface 12 and second surface 14 of the piece of glass 10 is beveled 16. A concave channel 18 is provided in the edge remaining between the bevels 16 in order to provide ridges 17.

FIG. 3 corresponds to FIG. 2, and shows the result of pressure contact between the piece of glass 10 and a strip of molding 20. The piece of glass has two upward facing protrusions, namely, ridges 17. Upon contact with the molding, the molding forms three downward facing protrusions, namely, one contacting each of the bevels 16 and one extending into the concave channel 18. As a result of the design of the piece of glass, the geometric configuration of the contact patch through which air must pass is not planar as in a conventional contact patch between a flat or rounded piece of glass and a strip of molding. Rather, the contact patch is five-lobed, comprising the three downward facing and two upward facing lobes described above. The weather tightness of the seal formed between the piece of glass of this invention and the molding is thus greatly improved as compared to a conventional contact seal.

FIGS. 2 and 3 show how a window and molding can be securely mated as in the constructing a window as for a building or as in an automobile window 21 as shown in FIG. 5 which is slidably mounted in a door 22 having an integral window frame 23, so that all mating forces between the window and frame are perpendicular to the surface of the molding (e.g., element 20 in FIG. 3) which is permanently fixed to the window frame of the door.

FIG. 6 shows the general shape of an automobile roof 24 to which molding 25 is attached in the case of an automobile door of the type which does not include a frame for the window. In this case the window 12 can be closed either by sliding upwardly or by the sideways movement of the glass as the door is opened and closed. In this case the bevels are preferably provided asymmetrically so that the channel is oriented to face the slanted molding, and the general shape of the window is preferably also curved so that the top of the window is inclined inwardly towards the automobile.

FIG. 4 shows a generally circular design as may be employed in port holes in boats, eyeglasses, scuba diving masks, etc. Although the shape of the glass is shown as planar, it will be readily understood that the shape may be bowed or curved in accordance to an intended use, such as in an eyeglass.

It should be understood from the above that the glass of the present invention is not necessarily limited to flat glass, and can be applied to any generally flat configuration such as lenses of glasses. Further, it should be understood that the beveled and concave channeled edge feature need not extend around the entire periphery of the glass; rather, it need be provided only in those areas where contact mating between glass and a contact surface are to be improved. For example, in an automobile power window, it would not be necessary to provide a channel along the bottom of the window glass.

It will be readily apparent that the mating surface edge design of the present invention can be used to improve the mating beteen any solid planar material which must be contact mated with any resilient or pliable molding, and particularly where it is desired to have improved weather resistance. The present edge design has advantages which render the design useful for virtually unlimited possibilities.

Although the system was first designed for mounting windows in an automobile, and particularly windows which can be opened and closed by sliding, it will be readily apparent that the system is capable of application to related vehicles such as boats, airplanes, and recreational vehicles, and to any number of other applications, such as in buildings, watches, display cases, eye glass lenses, scuba diving mask lenses, etc. Although this invention has been described in its preferred form with a certain degree of particularity with respect to automobiles, it is understood that the present disclosure of the preferred form has been made only by way of example and that numerous changes in the details of structures and the composition of the system may be resorted to without departing from the spirit and scope of the invention.

Now that the invention has been described, what is claimed is:

1. A vehicle body window assembly comprising a frame defining a window opening and having a resilient member extending along at least one internal surface thereof, and a window glass panel slidably mounted in association with said frame for releasably abutting against said resilient member when in a closed position, wherein said window glass panel comprises a first surface and a second surface surrounded by an edge, wherein said edge is beveled at the intersection of said first surface and said edge and is beveled at the intersection of said second surface and said edge, and wherein a concave channel runs between said bevels to form a ridge along the intersection of said concave surface and said bevels.

2. A method for providing a non-permanent air-tight seal between a piece of glass and a resilient material, comprising urging said window glass against said resilient material, wherein said window glass comprises a first surface and a second surface surrounded by an edge, wherein said edge is beveled at the intersection of said first surface and said edge and is beveled at the intersection of said second surface and said edge, and wherein said concave surface runs between said bevels to form a ridge along the intersection of said concave surface and said bevels.

* * * * *